United States Patent Office 3,347,917
Patented Oct. 17, 1967

3,347,917
PROCESS FOR THE PREPARATION OF DI(PARA-AMINOCYCLOHEXYL)METHANE
Wilfred J. Arthur, Charleston, W. Va., assignor to E. I. du Pont de Nemours and Company, Wilmington, Del., a corporation of Delaware
No Drawing. Filed June 11, 1964, Ser. No. 374,297
4 Claims. (Cl. 260—563)

ABSTRACT OF THE DISCLOSURE

Hydrogenation of di(para-aminophenyl)methane at temperatures of 180 to 300° C. and pressures above 500 pounds per square inch in the presence of from 1 to 100% of ammonia and 0.01 to 10% of metallic ruthenium both based on the weight of di(para-aminophenyl)methane to obtain a high yield of di(para-aminocyclohexyl)methane rich in trans,trans-stereoisomer. The hydrogenation being carried out in 1 to 30 minutes in the presence or absence of a liquid organic solvent such as dioxane.

---

This application is a continuation-in-part of copending applications Ser. No. 163,057 and Ser. No. 163,058, filed Dec. 29, 1961, now abandoned.

This invention relates to the preparation of di(para-aminocyclohexyl)methane and more particularly to the preparation of a composition of isomers of di(para-aminocyclohexyl)methane of a particular preferred proportion.

Di(para-aminocyclohexyl)methane, also referred to as bis(4 - aminocyclohexyl)methane, and hereinafter referred to as PACM, exists in any of three stereoisomeric forms, ordinarily referred to as the trans,trans-isomer, the cis,-trans-isomer and the cis,cis-isomer. PACM can be obtained composed of one of these stereoisomers, or composed of a mixture of any two or all three of them.

PACM can be used, for example, in the preparation of some polyamides by reaction with an acid such as sebacic acid. The stereoisomeric composition of the PACM will determine some of the properties of the polyamide to be formed. To obtain a polyamide with properties derived from the trans,trans-isomer of PACM it is necessary to have as a starting material a PACM material of high trans,trans-isomer content.

The most serious limitations of prior processes for the preparation of PACM have been an inability to produce a PACM rich in trans,trans-isomer in good yields, and the length of time the reactant and product were exposed to the catalyst under reaction conditions. The long reaction times tended to increase decomposition problems, tar and by-product formation, and unwanted condensation. I have discovered a process which accomplishes complete hydrogenation, with excellent yields of PACM at or near equilibrium concentration of the stereoisomers in amazingly short times. The process is characterized by the formation of little or practically no tars, decomposition products or condensation products.

The preparation of PACM by the hydrogenation of di(para-aminophenyl)methane is known in the art as shown in Barkdoll et al. U.S. Patent No. 2,606,928, issued Aug. 12, 1952. However, the process there disclosed would give only 90 to 95% conversion, yields below 70% and a composition of isomers low in the trans-trans-isomer and high in the cis,trans and cis,cis-isomers.

Some efforts have produced PACM with a trans,trans-isomer content on the order of 50%, such as Barkdoll et al. U.S. Patent No. 2,606,927 issued Aug. 12, 1952, but such a process has the distinct disadvantage of producing the desired product in yields no higher than 52.5% and as low as 16%. The combination of high temperature and extended reaction time tend to reduce over-all yield of useful compounds and increase the amount of nonusable by-products formed. The two to three hours reaction time of Barkdoll et al. 2,606,927 results in yields of 25 to 30% of a polymeric non-volatile solid product.

Other attempts have been made to improve the reaction such as by carrying it out in the presence of various catalysts. Barkdoll et al. 2,606,927 discloses nickel and cobalt as process catalysts. A ruthenium catalyst is known to have some advantages as disclosed in Whitman U.S. Patent No. 2,606,925, issued Aug. 12, 1952. However, the process there disclosed is run in the absence of ammonia for from two to four and one-half hours. Yields were as low as 73% with none higher than 90% and the PACM composition was mainly cis, cis or cis-trans-isomer as indicated by the liquid product.

Therefore, a principal object of my invention is to prepare a PACM mixture of its stereoisomers containing at least 45% of the trans,trans-isomer. The equilibrium concentration of PACM stereoisomers, that is the equilibrium for the ratio of the isomers to each other, in a hydrogenation process such as this is approximately 7% cis,cis-isomer, approximately 38.5% cis,trans-isomer, and approximately 54.5% trans,trans-isomer. Such a PACM product is a solid at room temperature. It is a principal object of my invention to produce this PACM mixture at or near its equilibrium concentration in very high yields based on the di(para-aminophenyl)methane introduced into the process.

According to the process of my invention, di(para-aminophenyl)methane, which is also called para,para'-methylenedianiline, and hereinafter referred to as MDA, is hydrogenated at elevated temperatures and pressures over a ruthenium catalyst in the presence of from about 1 to about 100 weight percent of ammonia based on the MDA being used, and optionally, but preferably, in the presence of a suitable solvent.

Surprisingly, by this process I have found that the reaction can be carried out in the remarkably short time of less than 30 minutes, and even as short as about 1 minute, with yields of from 93 to 97% and higher of a PACM isomer mixture approaching the isomer equilibrium concentration. Of course, the reaction can be maintained for longer periods of time, up to several hours or more if desired, but little benefit is derived from such an extended reaction time and by-product formation will naturally increase.

The MDA to be used can be prepared by conventional procedures or obtained from commercial sources and can contain up to several percent of impurities which are principally the ortho,para'-methylenedianiline.

The process can be run at temperatures ranging from about 180° C. to about 300° C., however, a preferred temperature range is from about 200 to about 275° C. and the most preferred temperature range is from 225 to 250° C.

The process is run at hydrogen partial pressures above about 500 pounds per square inch and ordinarily from about 2000 to about 3500 p.s.i. Higher hydrogen partial pressures can be used if desired but no practical advantage is apparent from this. The total pressure during hydrogenation will ordinarily be above 500 p.s.i. and can be as high as is practical. 15,000 p.s.i. is a practical upper limit for reasons of cost of equipment and operation.

The amount of ruthenium catalyst used will be at least 0.01% by weight of the MDA used calculated as metallic ruthenium. The catalyst can be present in amounts of up to 10% or more, but little practical advantage is gained from such amounts. Preferably, from about 0.1 to about 1.0% by weight of catalyst calculated as metallic ruthenium will give desired reactions at reasonable cost.

The types of ruthenium catalysts which can be used in this reaction are well known in the art. They comprise materials in which the active catalytic component is either elementary ruthenium, a ruthenium oxide, a salt of ruthenium in which ruthenium is in the anion, or a salt of ruthenium in which ruthenium is the cation and the anion is non-polymeric. Thus, there can be used such compounds as ruthenium chlorosalts, for example, potassium chloroperruthenate; ruthenium halides, for examples, ruthenium pentafluoride, ruthenium dichloride, and ruthenium tetrachloride; ruthenium sulfides, for example, ruthenium disulfide and trisulfide; ruthenium oxides, for example, ruthenium sesquioxide, ruthenium dioxide, and ruthenium tetraoxide; salts such as perruthenites, for example, barium perruthenite and sodium perruthenite; ruthenates, for example, ammonium, potassium, sodium, barium, strontium, calcium, magnesium and silver ruthenates; perruthenates, for example, potassium and sodium perruthenates; ruthenium sulfate, ruthenium nitrosonitrate, and the like. These catalysts are activated before use by means well known in the art.

If desired, the ruthenium catalyst to be used can be on a carrier such as charcoal, silica, gel, alumina, and the like. Such extended catalysts can be prepared by methods well known in the art such as by fusing ruthenium with sodium peroxide, dissolving the salt, pouring the resulting solution over the carrier and drying.

As pointed out, previously from about 1 to 100 weight percent of ammonia based on the MDA can be used in this process. Surprisingly, it appears that there is no upper limit on the amount of ammonia which can be present without harmful effect on yields. However, amounts of over 100% require higher total pressures and such use is therefore less economical and practical. Ordinarily, an amount between about 5 and 40% is preferred.

Contrary to the teachings of the prior art, relating to processes of this type, the presence of ammonia does not cause a repression of the hydrogenation in the process of my invention. The critical conditions of this process prevent such a repression and, as pointed out previously, permit essentially complete hydrogenations with conversions of well over 99% in periods of less than half an hour and even as short as one minute. Complete saturation, greater than 99.8%, can readily be obtained according to my invention.

The solvents which can be used in this process are, generally speaking, the liquid organic solvents which are not subject to hydrogenation under the conditions of this process. Such solvents as the saturated alicyclic and aliphatic hydrocarbon solvents are suitable including alicyclic and aliphatic hydrocarbon ethers. Representative of such solvents are dioxane, cyclohexane, n-hexane, dicyclohexyl ether, dioxolane, tetrahydrofuran, the amyl ethers, isobutyl ether, n-butyl ether, n-propyl ether, isopropyl ether, ethyl ether and the like. Alcohols such as n-butyl alcohol, isopropyl alcohol, ethyl alcohol, and methyl alcohol can be used, as can water. Mixtures of two or more solvents can also be used if desired.

The solvent, if used, will ordinarily be present in amounts of from about 0.2 to 2000 parts by weight per part of starting MDA. However, an amount from about 0.6 to about 1 part per part of MDA is preferred. Using an amount as large as 0.6 helps prevent such disadvantages as partial catalytic deactivation and restricting the amount to 1 part per part of MDA accomplishes the beneficial results of solvent presence as well as the use of many times more solvent.

As discussed herein, the process of this invention has been directed to a batch process. However, as will be understood by those skilled in the art, the process can be operated continuously. The variables and factors involved in the batch process can, by routine calculation, be converted to a continuous process. The relationships between batch and continuous reaction systems are described in detail in such references as O. Levenspiel, Chemical Reaction Engineering, John Wiley, 1962, and H. Krames and K. R. Westerterp, Chemical Reactor Design and Operation, Academic Press, 1963. The reaction times disclosed in the examples are applicable to continuous reactor systems only if there is no back mixing of products with reactants. As is known by those skilled in the art, continuous systems in which back mixing is employed require longer reaction times to accomplish equivalent degrees of conversion.

This invention will be better understood by reference to the following illustrative examples wherein parts are by weight unless otherwise indicated.

*Example 1*

At a temperature of 190° C. and a pressure of 5,000 pounds per square inch gauge in a pressure vessel, 125 grams of MDA in 75 milliliters of dioxane and 25 grams of ammonia are hydrogenated over a 5% ruthenium on charcoal catalyst, with a hold-up time of 25 minutes. The resulting material is filtered to remove the catalyst, then distilled to strip off the solvent and low-boiling products. The hydrogenated, fully saturated PACM product is taken off overhead. The yield of PACM is 115 grams (92% yield based on the MDA), with only a very small amount of by-product tars remaining in the heel. The PACM product, a solid at room temperature, analyzes 54.2% trans,trans-isomer, 41.5% cis,trans-isomer and the remainder cis,cis-isomer.

*Example 2*

At a temperature of 200° C. and a pressure of 4,000 pounds per square inch gauge in a pressure vessel, 100 grams of MDA, 100 milliliters of dioxane and 20 grams ammonia are subjected to hydrogenation over 12 grams of a finely divided catalyst of 5% ruthenium on a gamma-alumina support, for a period of 3¾ minutes plus a subsequent hold-up of 15 minutes at 5,000 pounds per square inch gauge pressure. The resulting mixture is freed of catalyst and solvent by filtration and distillation and the fully hydrogenated product is distilled under vacuum to give a yield of bis(4-aminocyclohexyl)methane, PACM, of about 96% based on MDA. This distilled, saturated amine is solid at room temperature, has a freezing point of about 43.5° C. and contains about 54% of the trans,trans-isomer.

*Example 3*

Example 2 is repeated using 75 grams of MDA, 20 grams of ammonia and 125 milliliters of tetrahydrofuran, with substantially complete hydrogenation after a period of 6¼ minutes. The hydrogenated product is isolated from the hydrogenation mixture by filtration and distillation and found to be PACM containing about 55% of the trans,trans-isomer and associated with about 1% lower boiling and 2% higher boiling impurities.

*Example 4*

At a pressure of 5,000 pounds per square inch gauge and a temperature of 200° C., 75 grams of MDA, 20 grams of ammonia and 125 milliliters of cyclohexane are hydrogenated in the presence of 10 grams of ruthenium on alumina catalyst to cessation of hydrogen-uptake, in 8¾ minutes. After an additional 15 minutes at 200° C., the mixture is cooled, depressured, and discharged from the pressure vessel and the catalyst removed by filtration. Freed of solvent by distillation the fully hydrogenated product is PACM of about 48% of the trans,trans-isomer along with 2.9% low boiling and 2.6% high boiling impurities.

*Example 5*

At a temperature of 200° C. and a pressure of 5,000 pounds per square inch gauge, 100 grams of MDA, 20 grams of ammonia, and 100 milliliters of di-isopropyl ether are hydrogenated fully over 10 grams of finely divided catalyst comprising 5% ruthenium on alumina support, in a period of 23 minutes. The fully hydrogenated product is freed of catalyst and solvent by filtration and distillation and is analyzed to be about 95% PACM, 3.1% low boiling deamination products and 0.9% high boiling impurities. Refined by fractional distillation under vacuum, the PACM fraction is solid at room temperature and contains about 54% of the trans,trans-isomer.

*Example 6*

At a temperature of 200° C. and a pressure of 5,000 pounds per square inch gauge, 100 grams of MDA, 100 milliliters of n-butanol and 25 grams of ammonia are hydrogenated over a ruthenium on alumina catalyst to about 99.4% completion in about 30 minutes, the reaction mixture is freed of catalyst and solvent by filtration and distillation and the resultant product is analyzed to be PACM containing 45% trans,trans-isomer, along with 3.7% low boiling deamination products, and 4.6% high boiling condnesation products.

*Example 7*

At a pressure of 5,000 pounds per square inch gauge and a temperature of 200° C. and in the presence of 25 grams of ammonia, 100 grams of MDA in 100 milliliters of di n-butyl ether is fully hydrogenated in 6 minutes over 10 grams of a catalyst comprising about 2% ruthenium deposited on a finely divided alumina support. Analytical characterization of the product indicates the presence o fabout 2.4% low boiling products and 0.8% high boiling residue in admixture with PACM containing 56% of the trans,trans-isomer.

*Example 8*

In a manner and under conditions substantially identical to those of Example 7, the hydrogenation of 97 grams of MDA containing about 3 grams of 2,4′ - diaminodiphenyl methane is essentially complete in 17¾ minutes when employing 10 grams of a finely divided catalyst comprising about 1% ruthenium on an alumina support. Subsequent analytical characterization of the solvent-free, catalyst-free crude product shows the presence of 2.9 parts of lower boiling and 0.5 parts of higher boiling fractions in admixture with 96.6 parts of mixed bis(aminocyclohexyl)methane containing 54% of the trans,trans-isomer.

*Example 9*

At a temperature of 200° C. and a pressure of 4,000 pounds per square inch gauge, 115 grams of MDA supported in 100 milliliters of di n-butyl ether, in the presence of 25 grams of ammonia is hydrogenated over a ruthenium on alumina catalyst until the indicated hydrogen absorption is very close to one-half that required for complete saturation. At the conclusion of this 3 minute period of limited hydrogenation the mixture is freed of ammonia, catalyst, and solvent by conventional means. It is fractionated by distillation, by which process it is shown to consist of about 1.7% low boilers, 30.3% PACM, 63.4% of the half-hydrogenated intermediate, para-(p-aminobenzyl)cyclohexylamine (PABC) and 4.6% high boiling residue which includes unhydrogenated starting material, if any. When the hydrogenation process as outlined herein is applied to the intermediate PABC, a 5 minute hydrogenation yields fully saturated material composed of PACM having a trans,trans-isomer content of 54% along with only 1.8% low boilers and 1.0% high boiling residue.

*Example 10*

At a temperature of 200° C. and a total pressure of 5,000 pounds per square inch gauge in a pressure vessel designed for agitation of the contents, 100 grams of para, para′-methylene dianiline and 50 grams of ammonia is subjected to hydrogenation over 20 grams of a finely sub-divided catalyst composed of 5% ruthenium on gamma alumina, for a period of 30 minutes. The vessel and contents are cooled to 50° C. and the bulk of the ammonia removed and made available for recovery by decreasing the total pressure to about one atmosphere. The crude hydrogenation product with its minor amount of entrapped ammonia is refined by being subjected to vacuum distillation, whereby there is obtained the completely saturated product bis(p-aminocyclohexyl)methane having a freezing point of 41.8° C. and containing 50% of the trans,trans-stereoisomer in admixture with the cis,trans and cis,cis-isomers.

*Example 11*

At a pressure of about 5,000 pounds per square inch gauge and a temperature of 225° C. into the top of a vertical reactor equipped with an inlet system for continuous introduction of hydrogen near the bottom and with a gas exit port at the top and also having a bottom exit for liquid, is injected a slurry composed of 4 parts by weight of a finely divided catalyst comprising 5% ruthenium on alumina, 10 parts of ammonia, 50 parts of n-butyl ether, and 30 parts para,para′-methylene dianiline at a rate that imposes upon the hydrogen sparged and continuously flowing slurry an average residence time within the reactor of about 6 minutes. The hydrogenated slurry at the exit of the reactor is let down to approximately atmospheric pressure in order to remove substantially all the dissolved ammonia which is recovered for recycle along with relatively small amount of accompanying flash-distilled solvent. The slurry is centrifuged free of catalyst, the catalyst being thereby made available for reuse, and the resulting crude product is distilled under vacuum to remove and recover solvent and to separate the fully hydrogenated product from any material not completely hydrogenated and by products. The distribution of compounds within the solvent free crude product is found to be about 0.6 part low boilers, 25.8 parts of the desired bis(p-aminocyclohexyl)methane having a freezing point of 40° C., 3 parts of the half-hydrogenated para-(p-aminobenzyl)cyclohexylamine, 0.3 part of starting aromatic material and about 0.3 part of miscellaneous high boiling tars, per 30 parts of starting aromatic feed. The material which is not fully hydrogenated is recycled continuously or intermittently as a portion of the feed to the hydrogenation reactor where it readily undergoes saturation to form the desired product as described above.

*Example 12*

At a temperature of 290° C. and a pressure of 5,000 pounds per square inch gauge in a pressure vessel, 125 grams of MDA in 75 milliliters of dioxane and 25 grams of ammonia are hydrogenated over a 5% ruthenium on charcoal catalyst, with a hold-up time of 25 minutes. The resulting material is filtered to remove the catalyst, then distilled to strip off the solvent and low-boiling products. The hydrogenated, fully saturated PACM product is taken off overhead. The yield of PACM is 125 grams, a 93% yield based on the MDA, with only a very small amount of by-product tars remaining in the heel. The PACM product, a solid at room temperature, analyzes 54.2% trans,trans-isomer, 38.5% cis,trans-isomer and 7.3% cis,cis-isomer.

*Example 13*

At a temperature of 260° C. and a pressure of 4,000 pounds per square inch gauge in a pressure vessel, 100 grams of MDA, 100 milliliters of isopropyl ether and 20 grams of ammonia are subjected to hydrogenation over 12 grams of a finely divided catalyst of 5% ruthenium on gamma-alumina support for a period of 5 minutes plus a subsequent hold-up of 15 minutes at 5,000 pounds per square inch gauge pressure. The resulting mixture is freed of catalyst and solvent by filtration and distillation and the fully hydrogenated product is distilled under vacuum to give a yield of 95% PACM based on the MDA. This distilled PACM is a solid at room temperature and contains about 54% of the trans,trans-isomer.

The foregoing detailed description has been given for clearness of understanding only and no unnecessary limitations are to be understood therefrom. The invention is not limited to the exact details shown and described for obvious modifications will occur to those skilled in the art.

The invention claimed is:

1. A process for the preparation of di(para-aminocyclohexyl)methane, consisting of at least 45% by weight of the trans,trans-stereoisomer, from di(para-aminophenyl)methane, comprising admixing di(para-aminophenyl)methane with hydrogen in the presence of from .01 to 10 weight percent of a ruthenium catalyst based on the weight of di(para-aminophenyl)methane, and from about 5 to about 40 weight percent of ammonia based on the weight of di(para-aminophenyl)methane, and heating said admixture for from 1 to 30 minutes at a temperature of from 180° C. to 300° C. and at a pressure of from 500 to 15,000 pounds per square inch.

2. A process for the preparation of di(para-aminocyclohexyl)methane from di(para-aminophenyl)methane, said di(para-aminocyclohexyl)methane consisting of at least 45% by weight of the trans,trans-stereoisomer, comprising admixing di(para-aminophenyl)methane with hydrogen in the presence of from .01 to 10 weight percent of a ruthenium catalyst based on the weight of di(para-aminophenyl)methane and from about 5 to about 40 weight percent of ammonia based on the weight of di(para-aminophenyl)methane, and heating said admixture for from 1 to 30 minutes at a temperature of from 180° C. to 300° C. and at a pressure of from 500 to 15,000 pounds per square inch in the presence of an inert organic liquid solvent.

3. The process as set forth in claim 2 wherein said inert organic liquid solvent is isopropyl ether.

4. The process as set forth in claim 2 wherein said inert organic liquid solvent is cyclohexane.

References Cited

UNITED STATES PATENTS

| | | | |
|---|---|---|---|
| 2,606,926 | 8/1952 | Kirby | 260—563 |
| 2,606,927 | 8/1952 | Barkdoll et al. | 260—563 |

OTHER REFERENCES

Barkdoll et al.: Preparation of Bis(4-Aminocyclohexyl) Methane, July 3, 1952, Journal of American Chemical Society, pp. 1156–1159.

CHARLES B. PARKER, *Primary Examiner.*

N. W. WICZER, *Assistant Examiner.*